(12) United States Patent
Shaw et al.

(10) Patent No.: US 10,011,055 B2
(45) Date of Patent: Jul. 3, 2018

(54) FORCE RESPONSIVE PRE-IMPREGNATED COMPOSITE METHODS, SYSTEMS AND APPARATUSES

(71) Applicant: THE BOEING COMPANY, Chicago, IL (US)

(72) Inventors: Paul D. Shaw, Charleston, SC (US); Raviendra S. Suriyaarachchi, Daniel Island, SC (US); Richard E. Heath, Mount Pleasant, SC (US)

(73) Assignee: THE BOEING COMPANY, Chicago, IL (US)

( * ) Notice: Subject to any disclaimer, the term of this patent is extended or adjusted under 35 U.S.C. 154(b) by 87 days.

(21) Appl. No.: 15/225,411

(22) Filed: Aug. 1, 2016

(65) Prior Publication Data

US 2018/0029260 A1    Feb. 1, 2018

(51) Int. Cl.
| | |
|---|---|
| B32B 5/16 | (2006.01) |
| B29C 43/22 | (2006.01) |
| C08J 3/24 | (2006.01) |
| C08J 5/24 | (2006.01) |
| B29C 70/54 | (2006.01) |
| B29B 15/10 | (2006.01) |
| B29K 63/00 | (2006.01) |
| B29L 9/00 | (2006.01) |

(52) U.S. Cl.
CPC ............. *B29C 43/22* (2013.01); *B29B 15/10* (2013.01); *B29C 70/546* (2013.01); *C08J 3/241* (2013.01); *C08J 5/24* (2013.01); *B29K 2063/00* (2013.01); *B29L 2009/00* (2013.01)

(58) Field of Classification Search
CPC ..... B29C 43/22; B29K 2063/00; B29B 15/10; C08J 5/24; C08J 3/241; B29L 2009/00
See application file for complete search history.

(56) References Cited

U.S. PATENT DOCUMENTS 9,193,129 B2    11/2015    Rogalski

FOREIGN PATENT DOCUMENTS

| EP | 0672707 A2 | 9/1995 |
|---|---|---|
| EP | 3000850 A1 | 3/2016 |
| GB | 2521636 A | 1/2015 |
| WO | 2008100303 A1 | 8/2008 |

OTHER PUBLICATIONS

Extended European Search Report for Application No. EP 17170469.5-1308, published Nov. 10, 2017.
Tao Yin, Lin Zhou, Min Zhi Rong, and Ming Qiu Zhang; article entitled Self-Healing Woven Glass Fabric/Epoxy Composites With the Healant Consisting of Micro-Encapsulated Epoxy and Latent Curing Agent from Smart Materials and Structures dated Oct. 1, 2008; pp. 1-8.

*Primary Examiner* — Shane Fang
(74) *Attorney, Agent, or Firm* — Coats & Bennett, PLLC

(57) ABSTRACT

Composite materials comprising at least one ply of dry fiber prepreg material comprising encapsulated resin-containing particles, components made from such composite materials, and methods of making such composite materials and dry fiber prepreg materials are set forth herein.

22 Claims, 16 Drawing Sheets

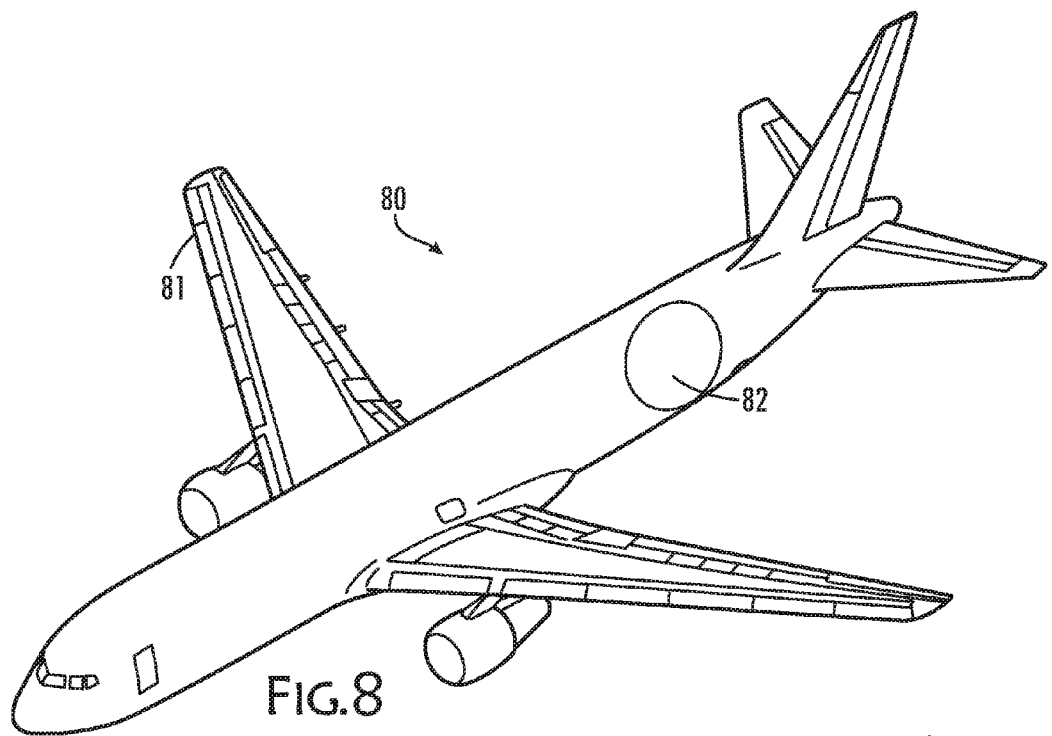
FIG. 8
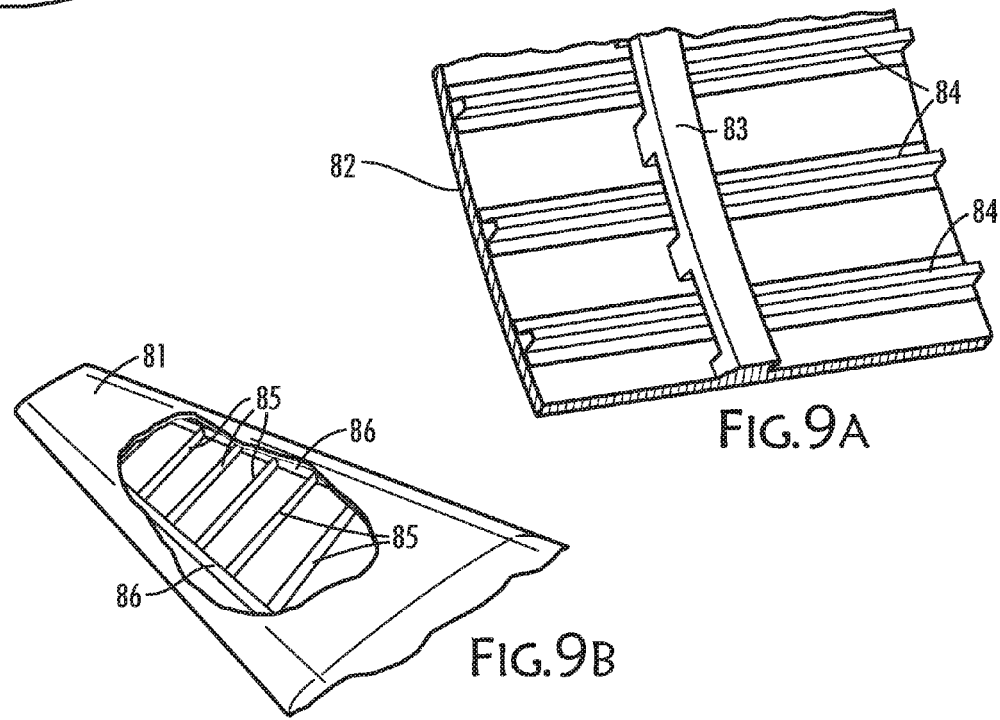
FIG. 9A
FIG. 9B

FORCE RESPONSIVE PRE-IMPREGNATED COMPOSITE METHODS, SYSTEMS AND APPARATUSES

TECHNOLOGICAL FIELD

The present disclosure generally relates to the field of prepreg composite materials. More particularly, the present disclosure relates to pre-impregnating a layer, or ply, of composite material with encapsulated resin.

BACKGROUND

Prepregs are "pre-impregnated" composite fibers where a matrix material, such as an epoxy resin-containing material, is already present. The fibers often take the form of a weave and the matrix is used to bond them together and to other components during manufacture. The matrix is typically partially cured to allow easy handling; this is called B-Stage material and requires cold storage to prevent complete curing. Therefore, B-Stage prepregs are stored in cooled areas, as heat accelerates complete polymerization. Hence, an autoclave or oven is often required to complete the curing where manufacturing structures comprising prepreg layers or plies.

Prepregs allow for the impregnation of a fiber-containing material on a flat workable surface. Stacks of prepreg plies are then formed, with the stack then formed into a desired shape. Prepregs also allow one to impregnate a bulk amount of fiber and then store the prepreg in a cooled area for an extended period of time to cure later.

The use of conventional prepregs impacts the timing of manufacturing as the prepregs may begin to partially cure as they achieve room temperature, typically from a refrigerated state. In addition, the presence of the resin-containing material in the prepregs renders a surface tack to the prepregs that can present difficulties, for example, when prepregs are used in automated processes where residual resin over time can require significant down time for automated machine cleaning, etc. Further, when prepregs are laid up, or stacked into a configuration for part or component formation, the surface tack of the layers can present challenges to using prepregs in certain automated composite forming processes, and can lead to significant waste in terms of material, time and cost due to trimming that is required if, for example, misalignment of laminate layers (e.g. prepreg stacks) occurs in laminate composite part formation.

BRIEF SUMMARY

The present disclosure relates to methods, systems and apparatuses relating to dry fiber prepreg plies comprising an amount of encapsulated resin-containing material and forming components from a multi-layered prepreg stack, with the prepreg stack comprising prepreg plies having predetermined amounts of resin-containing material, and components formed through the use of such prepreg plies.

An aspect of the present disclosure is directed to a method comprising orienting at least one dry fiber prepreg ply, with the dry fiber prepreg ply comprising encapsulated resin-containing particles, with the encapsulated resin-containing particles collectively comprising an amount of encapsulated resin-containing material; applying pressure to the dry fiber prepreg ply; rupturing a first predetermined amount of the encapsulated resin-containing particles; releasing a first predetermined amount of resin from the encapsulated resin-containing particles; and impregnating the dry fiber prepreg ply with the first predetermined amount of resin-containing material released from the ruptured encapsulated resin-containing particles to form a resin-impregnated prepreg ply.

In another aspect, the method further comprises curing the resin-impregnated prepreg ply.

In another aspect, in the step of orienting the dry fiber prepreg ply, a plurality of dry fiber prepreg plies are oriented relative to one another to form a multi-ply prepreg stack.

In yet another aspect, in the step of orienting the dry fiber prepreg ply, the dry fiber prepreg ply comprises carbon fibers, carbon/graphite fibers, glass fibers, aramid fibers, boron fibers, etc., and combinations thereof.

In still another aspect, in the step of orienting the dry fiber prepreg ply, the resin-containing material comprises epoxy-based resin materials.

In a further aspect, in the step of orienting the dry fiber prepreg ply, the resin-containing material comprises acrylic-based resin materials.

In another aspect, in the step of orienting the dry fiber prepreg ply, the resin-containing material comprises is an epoxy-based resin material comprising digylcidyl ethers of bisphenol A; dicgylcidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

In another aspect, in the step of orienting the dry fiber prepreg ply, the resin-containing material comprises is an acrylic-based resin material.

In a further aspect, in the step of orienting the dry fiber prepreg ply, the encapsulated resin-containing particles comprise an average diameter ranging from about 20 microns to about 1000 microns.

In a further aspect, in the step of orienting the dry fiber prepreg ply, the encapsulated resin-containing particles comprise an average diameter ranging from about 50 microns to about 400 microns.

In another aspect, the step of applying pressure to the dry fiber prepreg ply, further comprises applying a pressure ranging from about 250 $lb/ft^2$ to about 350 $lb/ft^2$ to the encapsulated resin-containing particles.

In yet another aspect, in the step of orienting the dry fiber prepreg ply, the dry fiber prepreg ply comprises at least one surface having a tack value ranging from about 0.1 psi to about 50 psi.

In a still further aspect, in the step of orienting dry fiber prepreg ply, the encapsulated resin-containing particles comprise an average particle wall thickness ranging from about 100 nm to about 1 micron.

In another aspect, in the step of orienting a dry fiber prepreg ply, the encapsulated resin-containing particles comprise a shell material, with the shell material comprising urea polyimide, melamine-, formaldehyde, urea-formaldehyde, polyurea-formaldehyde, polyoxymethylene, and combinations thereof.

In yet another aspect, in the step of rupturing a first predetermined amount of encapsulated resin-containing particles, the first predetermined amount of ruptured encapsulated resin-containing particles ranges from about 25% to about 75% of the total amount of encapsulated resin-containing particles.

A still further aspect contemplates, in the step of curing the resin-impregnated prepreg ply, a second predetermined amount of encapsulated resin-containing particles rupture.

In a further aspect, in the step of curing the multi-ply prepreg stack, a second predetermined amount of ruptured encapsulated resin-containing particles ranges from about 25% to about 75% of the total amount of encapsulated resin-containing particles.

In another aspect, in the step of curing the multi-ply stack, the multi-ply stack is exposed to a curing temperature ranging from about 250° F. to about 350° F.

In another aspect, the disclosure is directed to is directed to a method comprising orienting at least one dry fiber prepreg ply, with the dry fiber prepreg ply comprising encapsulated resin-containing particles, with the encapsulated resin-containing particles collectively comprising a predetermined amount of encapsulated resin-containing material; applying pressure to the dry fiber prepreg ply; rupturing a first predetermined amount of the encapsulated resin-containing particles; releasing a first predetermined amount of resin from the encapsulated resin-containing particles; impregnating the dry fiber prepreg ply with the first predetermined amount of resin-containing material released from the ruptured encapsulated resin-containing particles to form a resin-impregnated prepreg ply; and curing the resin-impregnated prepreg ply.

In a still further aspect, before the step of curing the resin-impregnated prepreg ply, further comprising the step of tooling a multi-ply prepreg stack.

In another aspect, a component comprises a composite material made according to a method comprising orienting at least one dry fiber prepreg ply, with the dry fiber prepreg ply comprising encapsulated resin-containing particles, with the encapsulate resin-containing particles collectively comprising a predetermined amount of encapsulated resin-containing material; applying pressure to the dry fiber prepreg ply; rupturing a first predetermined amount of the encapsulated resin-containing particles; releasing a first predetermined amount of resin from the encapsulated resin-containing particles; and impregnating the dry fiber ply with the first predetermined amount of resin-containing material released from the ruptured encapsulated resin-containing particles to form a resin-impregnated prepreg ply, dry fiber prepreg plies are oriented relative to one another to form a multi-ply prepreg stack, tooling the multi-ply prepreg stack, and curing the resin impregnated prepreg plies in the multi-ply prepreg stack.

In a further aspect, an object that can be a stationary structure or a mobile structure such as, for example a vehicle, comprises a component comprising a composite material made according to a method to a method comprising orienting at least one dry fiber prepreg ply, with the dry fiber prepreg ply comprising encapsulated resin-containing particles, with the encapsulate resin-containing particles collectively comprising an amount of encapsulated resin-containing material; applying pressure to the dry fiber prepreg ply; rupturing a first predetermined amount of the encapsulated resin-containing particles; releasing a first predetermined amount of resin from the encapsulated resin-containing particles; and impregnating the dry fiber prepreg ply with the first predetermined amount of resin-containing material released from the ruptured encapsulated resin-containing particles to form a resin-impregnated prepreg ply, dry fiber prepreg plies are oriented relative to one another to form a multi-ply prepreg stack, tooling the multi-ply prepreg stack, and curing the resin impregnated prepreg plies in the multi-ply prepreg stack.

According to a further aspect, the vehicle mentioned above is selected from the group consisting of: a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface marine vehicle; an unmanned marine surface vehicle; a manned sub-surface marine vehicle; an unmanned sub-surface marine vehicle, and combinations thereof.

Still further, an aspect of the present disclosure is directed to a method comprising applying a predetermined amount of encapsulated resin-containing particles to a dry fiber prepreg ply, with the encapsulated resin-containing particles configured to rupture at a pressure ranging from about 250 lb/ft$^2$ to about 350 lb/ft$^2$, and maintaining the impregnated dry fiber prepreg ply in a substantially dry state after applying the predetermined amount of encapsulated resin-containing particles in the dry fiber prepreg ply.

In a further aspect, in the step of applying a predetermined amount of encapsulated resin-containing particles to a dry fiber prepreg ply to the fiber prepreg ply, further comprising applying the encapsulated resin-containing particles as a surface layer to the dry fiber prepreg ply.

In another aspect, in the step of applying a predetermined amount of encapsulated resin-containing particles to a dry fiber prepreg ply to the dry fiber prepreg ply, further comprising embedding the encapsulated resin-containing particles into dry fiber prepreg ply.

In a further aspect, a dry fiber prepreg comprises an amount of encapsulated resin-containing particles, with the encapsulated resin-containing particles comprising resin-containing material, wherein a first predetermined amount of the encapsulated resin-containing particles are configured to rupture at an applied pressure ranging from about 250 lb/ft$^2$ to about 350 lb/ft$^2$, and the encapsulated resin-containing particles are configured to release a first predetermined amount of resin-containing material from the encapsulated resin-containing particles into the dry fiber prepreg ply.

In another aspect, the dry fiber prepreg ply comprises carbon fibers, carbon/graphite fibers, glass fibers, aramid fibers, boron fibers, etc., and combinations thereof.

In a further aspect, the resin in the encapsulated resin-containing particles comprises epoxy-based resin materials.

In a further aspect, the resin in the encapsulated resin-containing particles comprises acrylic-based resin materials.

A still further aspect of the present disclosure is directed to a multi-ply stack of dry fiber plies comprising a plurality of individual dry fiber plies, with at least one dry fiber ply comprising an amount of encapsulated resin-containing material.

In another aspect, the encapsulated resin-containing particles comprise a diameter ranging from about 20 microns to about 1000 microns.

In yet another aspect, the encapsulated resin-containing particles are configured to rupture and release resin-containing material at a pressure ranging from about 250 lb/ft$^2$ to about 350 ft/lb.

In a still further aspect, a composite material comprises is made from a multi-ply stack comprising a plurality of dry fiber prepreg plies, with the prepreg plies comprising a predetermined amount of encapsulated resin-containing particles.

Another aspect is directed to a component comprising a composite material made from composite plies comprising a plurality of individual dry fiber plies, with at least one dry fiber ply comprising an amount of embedded encapsulated resin-containing material.

A further aspect is directed to an object comprising a component comprising a composite material made from composite plies comprising a plurality of individual dry fiber plies, with at least one dry fiber ply comprising an amount of encapsulated resin-containing material.

In another aspect, the object is a stationary object, wherein the stationary object comprises a support structure, or a building.

In a still further aspect, the object comprises a vehicle comprising a component comprising a composite material made from composite plies comprising a plurality of individual dry fiber plies, with at least one dry fiber ply comprising an amount of encapsulated resin-containing material.

In a further aspect, the vehicle is selected from the group consisting of: a manned aircraft; an unmanned aircraft; a manned spacecraft; an unmanned spacecraft; a manned rotorcraft; an unmanned rotorcraft; a manned terrestrial vehicle; an unmanned terrestrial vehicle; a manned surface marine vehicle; an unmanned marine surface vehicle; a manned sub-surface marine vehicle; an unmanned sub-surface marine vehicle, and combinations thereof.

BRIEF DESCRIPTION OF THE DRAWINGS

Figure 1:
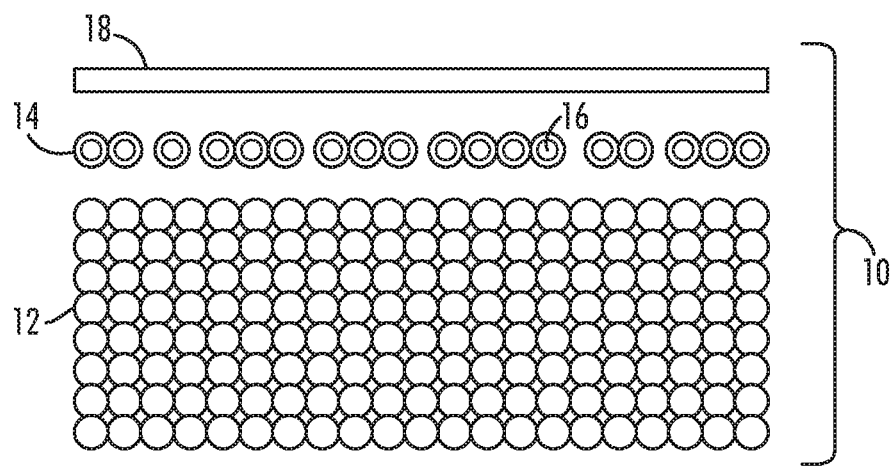
Figure 2:
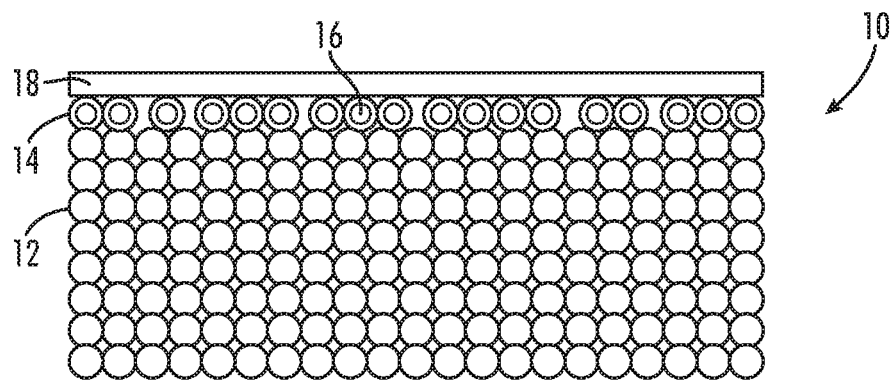
Figure 3:
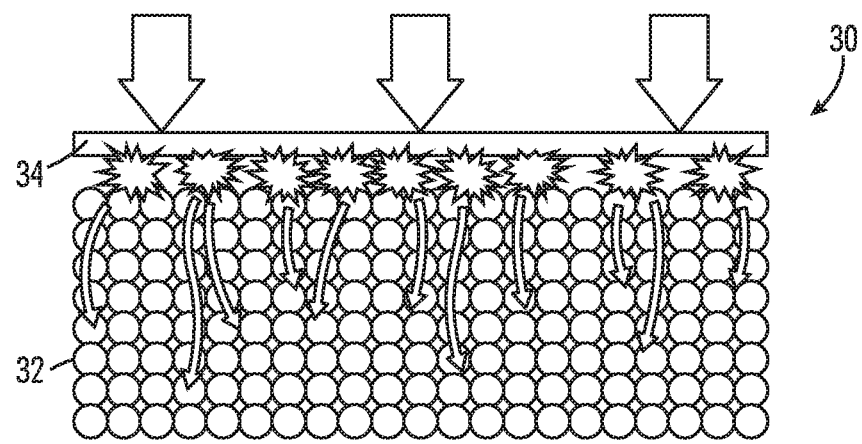
Figure 4:
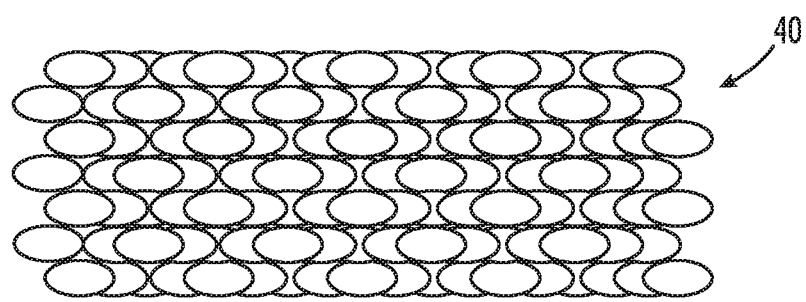
Figure 5:
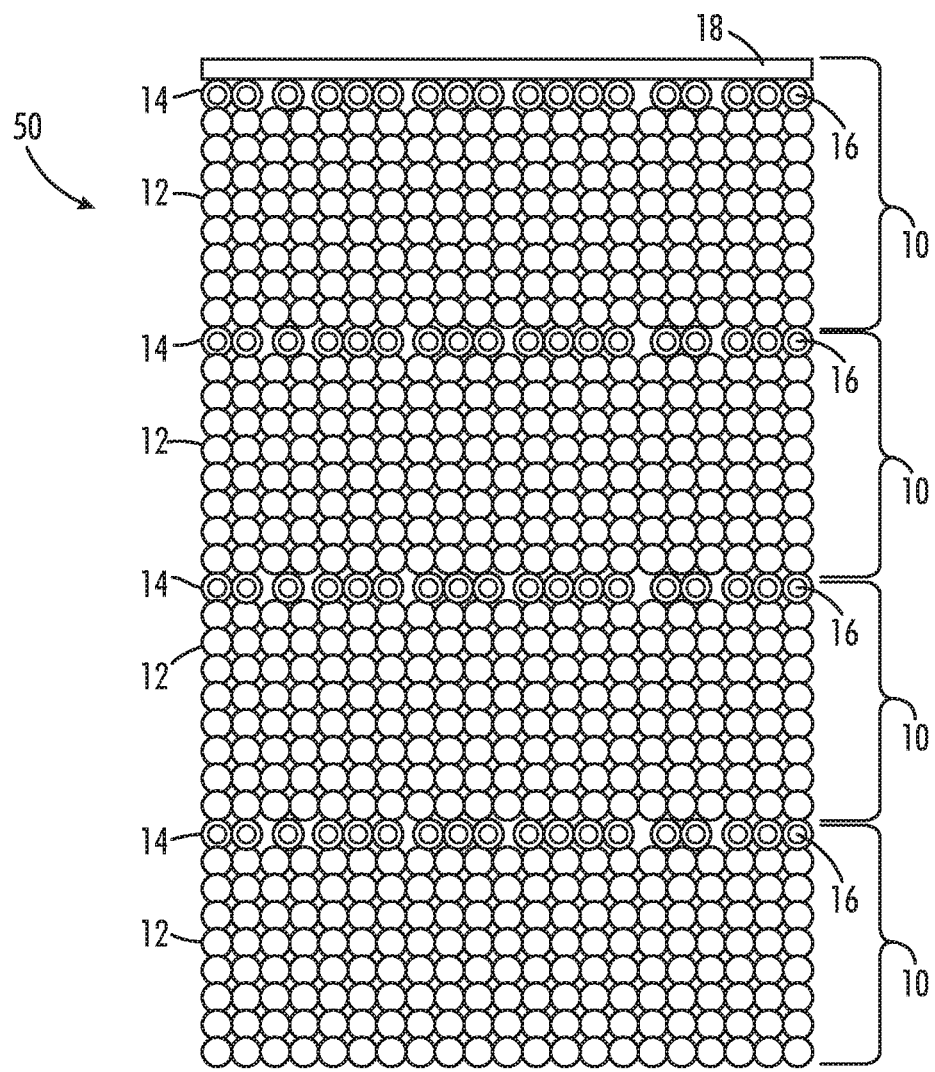
Figure 6:
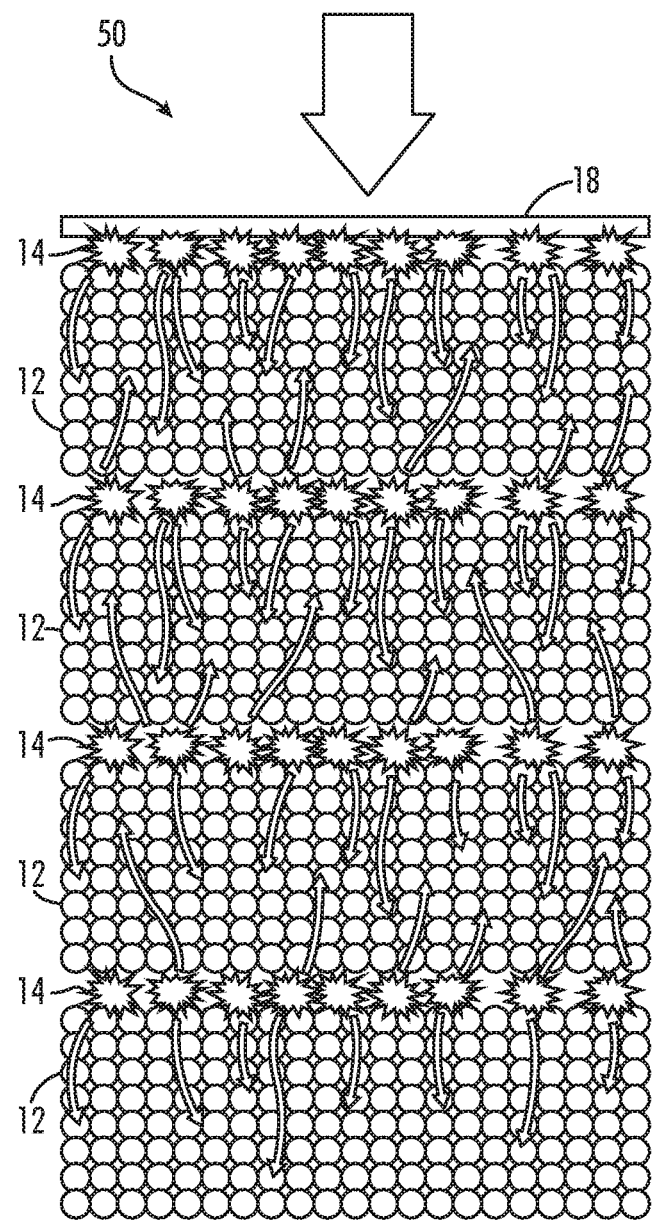
Figure 7A:
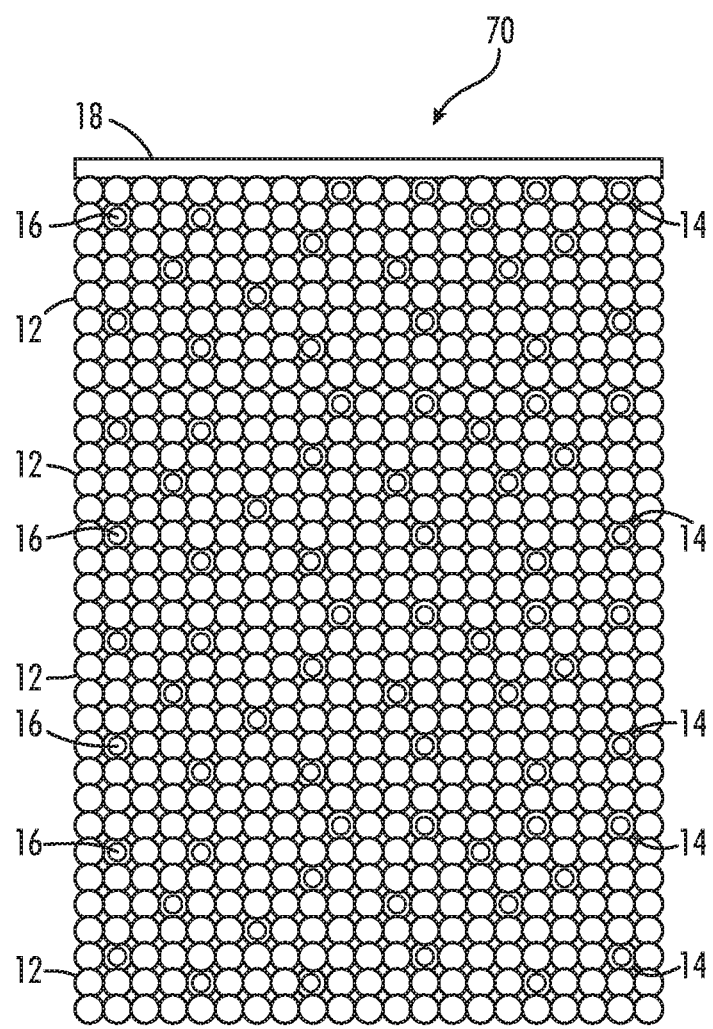
Figure 7B:
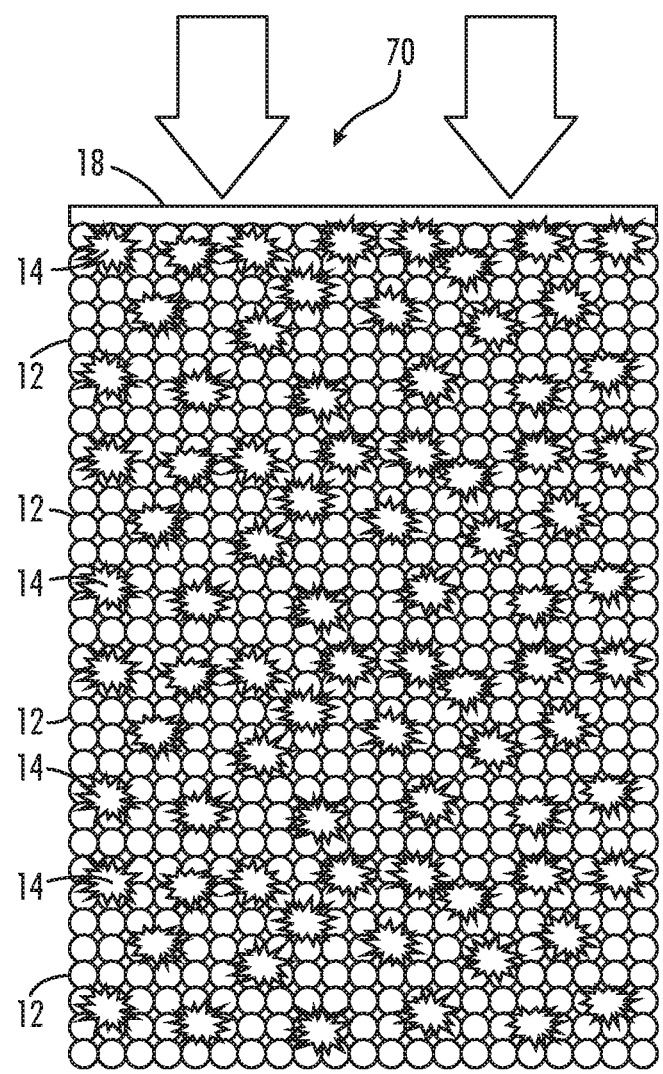
Figure 15:
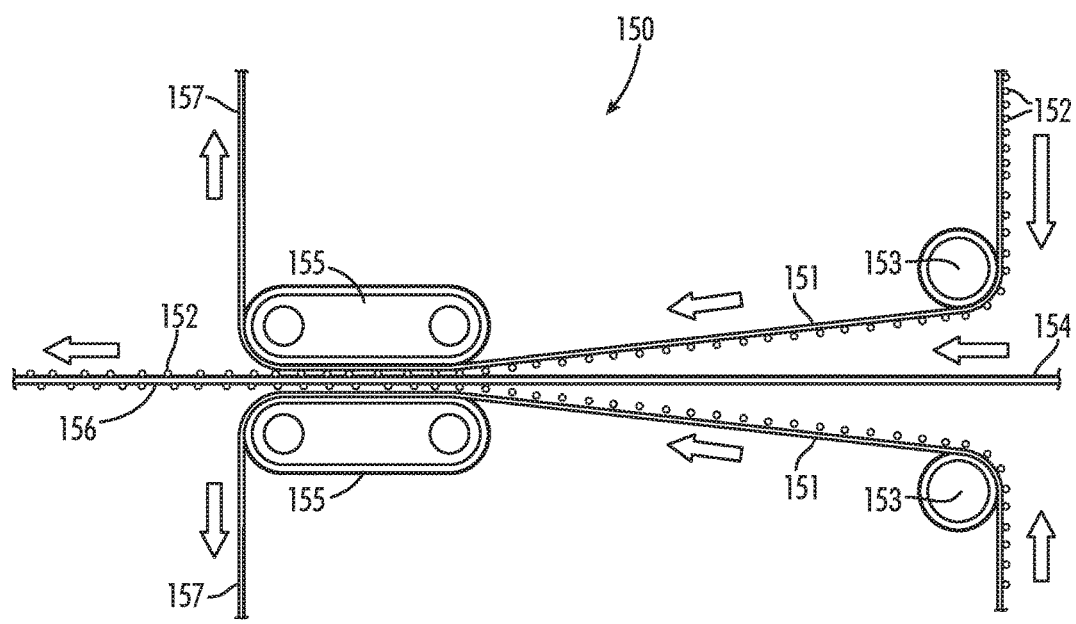

Having thus described variations of the disclosure in general terms, reference will now be made to the accompanying drawings, which are not necessarily drawn to scale, and wherein:

FIG. 1 is perspective cross-sectional view of an aspect of the present disclosure;

FIGS. 2-3 are a perspective cross-sectional views of an aspect of the present disclosure;

FIG. 4 is a perspective cross-sectional view of an aspect of the present disclosure showing a resin impregnated prepreg ply;

FIG. 5 is a perspective cross-sectional view of a an aspect of the present disclosure showing a plurality of dry fiber prepreg plies in a stacked orientation;

FIG. 6 is a perspective cross-sectional side view of an aspect of the present disclosure showing a plurality of dr fiber prepreg plies in a stacked orientation with pressure applied to the stack;

FIGS. 7A and 7B are perspective cross-sectional side views of an aspect of the present disclosure showing a plurality of prepreg plies with resin being released into the dry fiber prepreg;

FIG. 8 is an illustration of an aircraft comprising components made comprising composite materials according to aspects of the present disclosure;

FIG. 9A is a perspective view of an interior of a portion of an aircraft fuselage skin;

FIG. 9B is a partial cutaway view of an aircraft wing;

FIG. 10-14 are flowcharts outlining methods according to aspects of the present disclosure;

FIG. 15 is an illustration of a process for orienting encapsulated resin-containing particles into a dry fiber prepreg ply, according to an aspect of the present disclosure; and FIGS. 16A-16D and 17 are enlarged cross-sectional side views of a dry fiber prepreg stack comprising encapsulated resin-containing particles, according to aspects of the present disclosure.

DETAILED DESCRIPTION

The presently disclosed subject matter now will be described more fully hereinafter with reference to the accompanying Drawings, in which some, but not all aspects of the presently disclosed subject matter are shown. Like numbers refer to like elements throughout. The presently disclosed subject matter may comprise many different forms and should not be construed as limited to the aspects set forth herein; rather, many aspects are provided so that this disclosure will satisfy applicable legal requirements. Indeed, many modifications and other alternatives of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific aspects disclosed and that modifications and other aspects are intended to be included within the scope of the appended claims.

Aspects of the present disclosure are directed to methods and systems for making composite materials where the resin component in a prepreg material is provided to the dry fiber material from an encapsulated state. The present disclosure is further directed to composite materials made according to methods disclosed here, and also components and parts made from the composite materials that are made according to methods disclosed herein. Further, the present disclosure contemplates larger end-use products comprising parts and components that comprise composite materials made according to the methods disclosed herein.

The present disclosure therefore discloses methods comprising orienting at least one dry fiber prepreg ply, with the dry fiber prepreg ply comprising encapsulated resin-containing particles, with the encapsulated resin-containing particles collectively comprising an amount of encapsulated resin-containing material; applying pressure to the dry fiber prepreg ply; rupturing a first predetermined amount of the encapsulated resin-containing particles; releasing a first predetermined amount of resin from the encapsulated resin-containing particles; and impregnating the dry fiber ply with the first amount of resin-containing material released from the ruptured encapsulated resin-containing particles to form a resin-impregnated prepreg ply. The present disclosure also contemplates laying up a plurality of dry fiber prepreg plies to prepare a multi-ply prepreg stack, wherein the dry fiber prepreg plies comprising the encapsulated resin-containing particles are oriented into a desired position such as, for example, a laid up position prior to tooling and/or curing, etc.

According to the disclosure, the issue attending conventional laying up procedures for composite prepreg materials are significantly ameliorated through the use of the disclosed methods and systems where the composite material is shipped, stored, handled, and processed for tooling and curing in a "dry state". That is, the resin component of the presently disclosed composite materials (that are conventionally impregnated into the fiber matrix of the composite prepreg) is not released into the dry fiber matrix prior to laying up the composite prepreg. As a result, the prepregs of the present disclosure obviate problems otherwise routinely associated with presently known prepregs in terms of tack, storage requirements (at temperatures below ambient temperature), shelf or "pot" life (whereby composite prepregs may begin to slowly cure as they are exposed to room temperatures, etc. Since the composite prepregs of the present disclosure are not impregnated with a resin component prior to actual laying up of the prepreg, the composite materials remain in a dry fiber state until individual prepregs are arranged and otherwise oriented into a desired configuration, for example, on a lamination tool or mandrel.

As they relate to the fiber in the composite material, the terms "dry state" and "substantially dry state" are equivalent terms understood to be used interchangeably. Further, it is understood that the terms "dry state" and "substantially dry state" refer to a condition of the fiber used to make a composite material, wherein the fiber has not been directly exposed to a resin-containing material.

The tack values of conventional prepreg layers can adversely impact the condition of one or more prepreg layers in a composite material laminate. Maneuvering a plurality of prepreg layers relative to one another, such as during laying up the individual prepreg layers into a laminate, and during moving assembled laminates for tooling and curing, can cause undesirable wrinkling of one or more prepreg layers in a composite laminate, especially when the laminate is being formed into a complex shape or geometry, such as, for example a non-planar shape or geometry. Further, tack of conventional prepregs can adversely affect positioning of the prepregs relative to one another, (e.g., in the construction of a multi-ply prepreg stack, etc.) resulting in material waste (e.g. due to trimming and other material processing, etc.).

According to the present application, since resin material does not impregnate the fiber material of the prepreg until after the prepreg is positioned for tooling and/or curing, the tack values of the prepregs are substantially dependent only on the tack value of the fiber material in the prepreg in the fiber's "dry" fiber state. In other words, since the encapsulated resin material is not yet able to impregnate the fiber material, the resin material does not contribute to the tack value of the prepreg. This reduction in the tack value of the prepreg, facilitates predictable and desirable slippage between prepreg layers, especially when prepreg layers are stacked into a multi-ply prepreg orientation. Such slippage facilitates positioning of individual prepreg plies relative to one another as individual plies are stacked, and as the multi-ply prepreg stacks are maneuvered from station to station along the composite manufacturing process. Such stations include for example, and without limitation, laying up, tooling, curing, etc.

The prepregs of the present disclosure are understood to be composite prepregs comprising a fiber component and a resin-containing component. Contemplated fibers for use in the composite prepreg include, without limitation, carbon fibers, carbon/graphite fibers, glass fibers, aramid fibers, boron fibers, etc., and combinations thereof.

Contemplated resin containing components include, for example, epoxy resin-based compounds. Representative epoxy resin-based compounds include, without limitation, digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof. Contemplated resin containing components further include, for example, acrylic based compounds.

According to aspects of the present disclosure, resin-containing material is encapsulated and the encapsulated resin is incorporated into a composite dry fiber material to form a prepreg ply that is maintained in the dry fiber state (i.e. substantially no resin material is released into the dry fiber) such that the dry fiber material is not impregnated with the resin-containing material. For the purposes of this disclosure, the terms "encapsulated" and "micro-encapsulated" are equivalent and interchangeable terms and may be substituted for one another while having the same meaning. The resin-containing material is contained within encapsulated particles that are designed to withstand a predetermined amount of pressure before rupturing. In this way, the tack of the dry fiber prepreg is controllable and/or tunable, and the dry fiber prepreg therefore has a tack value that is determined only by the tack value of the dry fiber itself.

Encapsulation techniques contemplated according to aspects of the present disclosure include, without limitation, mini-emulsion polymerization techniques, polymer precipitation by phase evaporation techniques, polycondensation techniques, interfacial polymerization techniques, layer-by-layer polyelectrolyte deposition techniques, polymer growth by surface polymerization techniques, copolymer vesicle formation techniques, etc.

According to an aspect of the present disclosure, resin-containing material is encapsulated by producing a capsule wall material by combining polyvinyl alcohol with a urea-polyformaldehyde resin material. According to a further aspect, the encapsulated resin-containing particles comprise an average particle wall thickness ranging from about 100 nm to about 1 micron.

According to further aspect of the present disclosure, a portion of the encapsulated resin-containing particles incorporated into the dry composite fiber prepreg can be tailored to predictably rupture when the prepreg is subjected to a predetermined pressure. In this way, a predetermined amount of resin ranging from about 10 to about 100% of the total amount of resin contained in the encapsulated resin-containing particles can be predictably released from the particles and can impregnate the prepreg at any desired station during composite processing e.g. laying up, formation of a laminate, tooling, etc.) More preferably, a predetermined amount of resin ranging from about 25 to about 75% of the total amount of resin contained in the micro-particles can be predictably released from the micro-particles and can impregnate the prepreg in a predictable, predetermined and tailored fashion.

FIGS. 1-6 and 7A, 7B are enlarged cross-sectional side views of aspects of the present disclosure showing. FIG. 1 shows a dry fiber prepreg for assembly 10, according to an aspect of the disclosure comprising a dry fiber prepreg ply 12, encapsulated resin-containing particles 14, containing resin-containing material 16, and a release liner 18. FIG. 2 shows the components of FIG. 1 assembled into a prepreg ply 10 wherein the encapsulated resin-containing particles 14 are now in intimate contact with the dry fiber prepreg ply 12, and the release liner 18 is brought into intimate contact with the prepreg ply 12 that now comprises the encapsulate resin-containing particles 14. The arrows show an applied pressure that will be applied to the prepreg ply assembly for purposes of rupturing the encapsulated resin-containing particles.

FIG. 3 shows the prepreg assembly of FIGS. 1 and 2 with an amount of pressure applied to the prepreg ply assembly. As shown in FIG. 3, the previously dry prepreg assembly 10 of FIGS. 1 and 2 is converted into a resin-impregnated prepreg 30 comprising the fiber component 32 now being impregnated with resin-containing material released from the encapsulated particles as such particles rupture under pressure, as indicated by the Arrows. Release liner 34 is shown proximate to the resin-impregnated prepreg 32.

FIG. 4 shows a more fully resin-impregnated prepreg ply 40, as resin-containing material from the ruptured encapsulated resin-containing particles shown in FIG. 3 impregnates the fiber component of the prepreg.

FIG. 5 shows a plurality of the prepreg assemblies of the shown in FIGS. 1-2 arranged in a prepreg stack. As shown in FIG. 5, a multi-ply dry fiber prepreg stack 50 comprises a plurality of dry fiber prepreg plies 10. Each of the dry fiber prepreg plies 10, comprises a dry fiber prepreg plies 12, encapsulated resin-containing particles 14, containing resin-containing material 16. A release liner 18 is shown only in place on the top of the prepreg stack 50. In aspects of the present disclosure, the presence of the release liner is optional, but may be present during the handling, positioning and storing of the multiply prepreg stack 50. It is understood that the liner may be present or may be removed during the processing (e.g. orienting, tooling, forming, curing, etc.) of the multi-ply prepreg stack 50.

FIG. 6 shows the multi-ply prepreg stack 50 of FIG. 5 with pressure being applied (as shown by the Arrows) to the multi-ply stack. When a predetermined amount of pressure is applied to the multi-ply prepreg stack, a predetermined amount of the encapsulated resin-containing particles 14 rupture and release resin-containing material 16 from the particles 14. The resin-containing material 16 released from the ruptured particles 14 then impregnates the previously dry fiber prepreg material 12 and predictably migrates through the multi-ply stack 50. As shown, for example, in FIGS. 3, 6, 7B, 16C, 16D and 17, a predetermined amount of pressure, if desired, will rupture the substantial entirety of the encapsulated resin-containing particles. However, according to aspects of the present disclosure, the release of resin-containing material from the encapsulated resin-containing particles can be tailored and controlled, for example, by rupturing a predetermined portion of the particles that is less than the entire amount of encapsulated-resin containing particles applied to the dry fiber prepreg. For example, a predetermined amount of ruptured encapsulated resin-containing particles can range from 10% to 100% of the total amount of encapsulated resin-containing particles present and, more preferably, the predetermined amount of ruptured encapsulated resin-containing particles can range from 25% to 75% of the total amount of encapsulated resin-containing particles present.

In this way, a predetermined amount of resin-containing material may be released at various stages of the processing of the prepreg material. In other words, it may be desirable to release only a portion of the resin-containing material into the dry fiber prepreg prior to forming or tooling the prepreg. An amount of resin-containing material may be desired to partially impregnate the dry fiber prepreg during layup, or initial forming processes of the prepreg. However, it may also be desirable to allow prepreg plies in a multi-ply stack, or composite laminate to move or "slip" predictably relative to one another during a composite material's formation. In this way the tack of the individual plies in the composite, and the overall tack of the multi-ply stack being shaped into a composite material can be tailored (e.g. by releasing a predetermined amount, or none of the resin-containing material by rupturing the encapsulated resin-containing particles) to yield superior results in terms of "slippage", and in terms of inhibiting wrinkle formation in the composite material during composite material orientation and/or processing.

Depending on the tailoring of the resin-containing material from the encapsulated resin-containing particles, according to aspects of the present disclosure, a predetermined amount of the encapsulated resin-containing particles can be made to rupture at predetermined stages of the prepreg ply orientation and/or processing into a finished composite material. That is, an initial pressure may be applied to the prepreg plies to release a first predetermined amount of resin-containing material from the encapsulated resin-containing particles, followed by a second pressure applied later in the processing of the prepreg plies to release a second predetermined amount of resin-containing material from the encapsulated resin-containing particles, etc. In addition, aspects of the present disclosure contemplate maintaining a predetermined portion of the encapsulated-resin-containing particles until the curing phase of the composite material, wherein a further predetermined amount of resin-containing material is released from the encapsulated resin-containing particles, either from pressure on the composite material during curing conditions, or via a predetermined amount of curing heat and/or pressure presented to the composite material during curing. According to aspects of the present disclosure, contemplated curing regimens to cure the prepregs disclosed herein include curing temperatures ranging from about 250° F. to about 350° F. Further, the gelling stage, or gelation of the encapsulated resin-containing particles of the present disclosure will occur at a temperature ranging from about 150° F. to about 200° F. depending on the specific resin material that is encapsulated and the material used to encapsulate the resin. The gelling stage is understood to be the temperature at or about which the encapsulated resin-containing particles will rupture.

FIGS. 7A and 7B show aspects of the present disclosure whereby encapsulated resin-containing particles 14 containing resin-containing material are dispersed throughout the multi-ply stack 70 comprising dry fiber prepreg material 12. Such dispersal of the particles 14 can occur via settling, and such settling can be induced, for example, via vibration or other settling-inducing means. As in FIG. 6, FIG. 7B shows pressure being applied (as shown by the Arrows) to the multi-ply stack. When a predetermined amount of pressure is applied to the multi-ply prepreg stack, a predetermined amount of the encapsulated resin-containing particles 14 rupture and release resin-containing material 16 from the particles 14. The resin-containing material 16 released from the ruptured particles then impregnates the previously dry fiber prepreg material 12 and predictably migrates through the multi-ply stack.

FIG. 8 is a drawing of an aircraft 80. FIG. 9A is a view of the interior fuselage skin of the section encompassed by the circle 82 in FIG. 8. FIG. 9A therefore shows the interior section of a fuselage skin section 82 showing frame 83 and stringers 84 made from composite materials according to aspects of the present disclosure. FIG. 9B shows a partially exposed, or cutaway view of wing section 81 showing ribs 85 and spars 86 made from composite materials according to aspects of the present disclosure. It is further understood that the composite materials made according to aspects of the present invention can be used to fabricate further aircraft components and aircraft parts including pressure bulkheads, etc., as well as components and parts for any vehicles (in addition to aircraft) as well as stationary structures, such as those described more fully herein.

Figure 10:
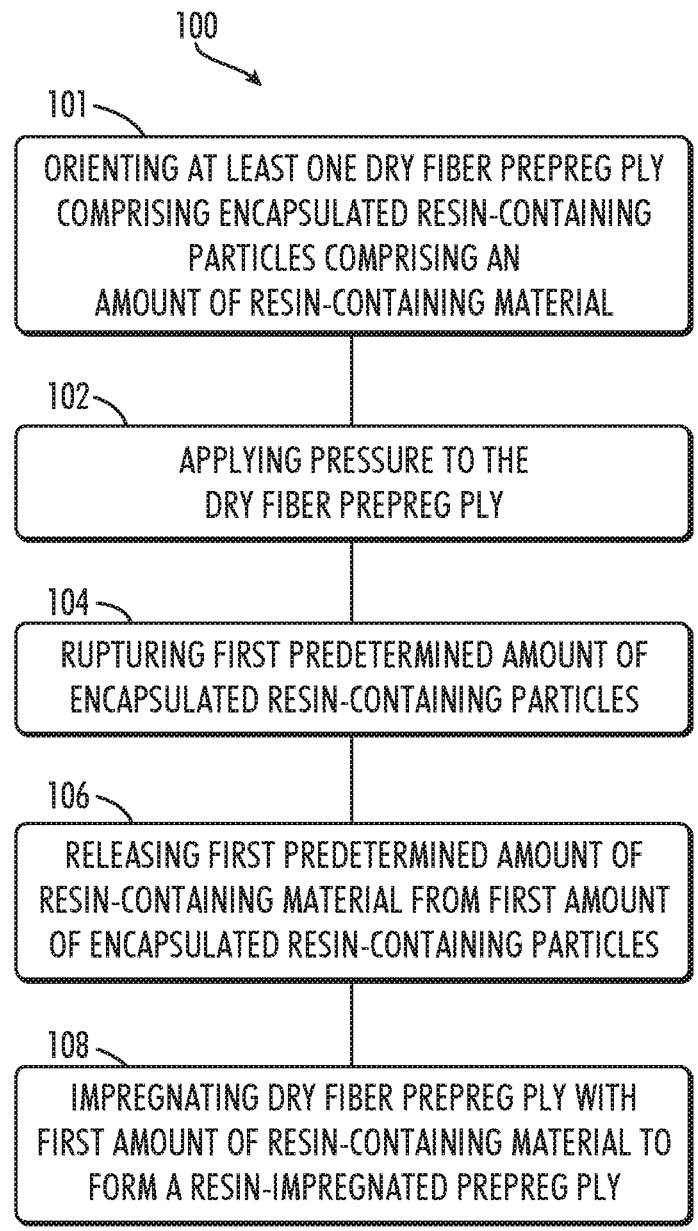

FIGS. 10-14 are flowcharts describing aspects of the present disclosure. FIG. 10 describes a method for making a prepreg ply according to aspects of the present disclosure. According to FIG. 10, a method 100 is illustrated comprising, 101 orienting at least one dry fiber prepreg ply comprising encapsulated resin-containing particles, 102 applying pressure to the dry fiber prepreg ply, 104 rupturing a first predetermined amount of encapsulated resin-containing particles, 106 releasing a first predetermined amount of resin-containing material from the first predetermined amount of resin-containing particles, and 108 impregnating the dry fiber prepreg ply with the first amount of resin-containing material released from the first amount of encapsulated resin-containing particles to form a resin-impregnated prepreg ply.

Figure 11:
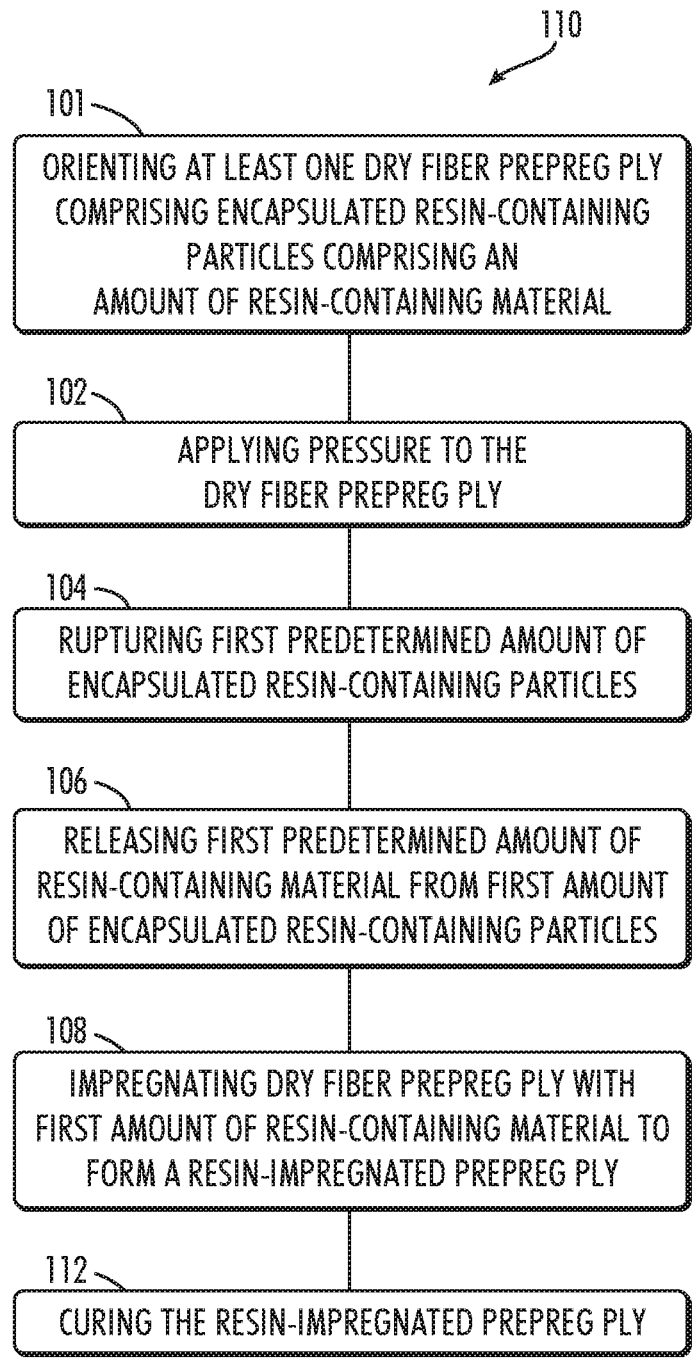

FIG. 11 illustrates a method 110 according to aspects of the present disclosure of 101 orienting at least one dry fiber prepreg ply comprising encapsulated resin-containing particles, 102 applying pressure to the dry fiber prepreg ply, 104 rupturing a first predetermined amount of encapsulated resin-containing particles, 106 releasing a first predetermined amount of resin-containing material from the first predetermined amount of resin-containing particles, 108 impregnating the dry fiber prepreg ply with the first amount of resin-containing material released from the first amount of encapsulated resin-containing particles to form a resin-impregnated prepreg ply, and 112 curing the resin-impregnated prepreg ply.

Figure 12:
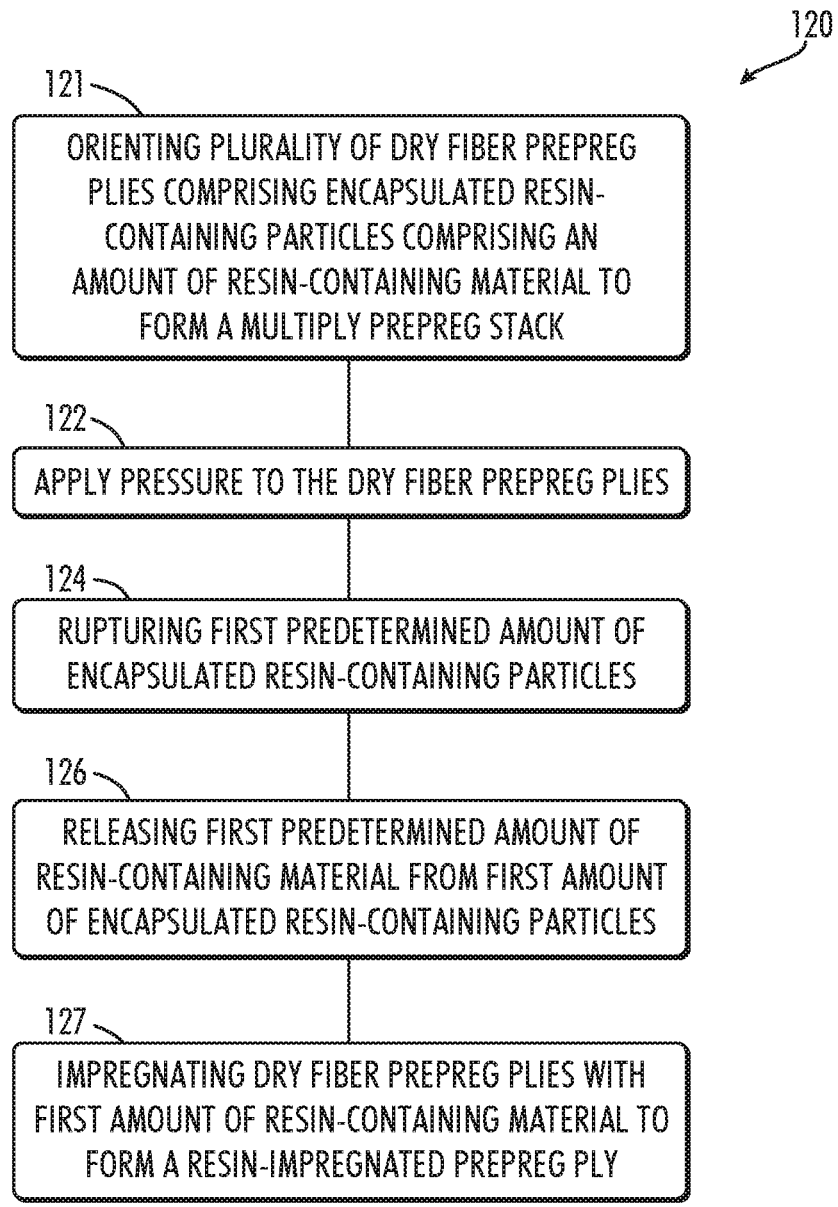

FIG. 12 illustrates a method 120 according to aspects of the present disclosure of 121 orienting a plurality of dry fiber prepreg plies comprising encapsulated resin-containing particles to form a multi-ply prepreg stack, 122 applying pressure to the dry fiber prepreg plies, 124 rupturing a first predetermined amount of encapsulated resin-containing particles, 126 releasing a first predetermined amount of resin-containing material from the first predetermined amount of resin-containing particles, and 127 impregnating the dry fiber prepreg plies with the first amount of resin-containing material released from the first amount of encapsulated resin-containing particles to form a resin-impregnated prepreg ply.

Figure 13:
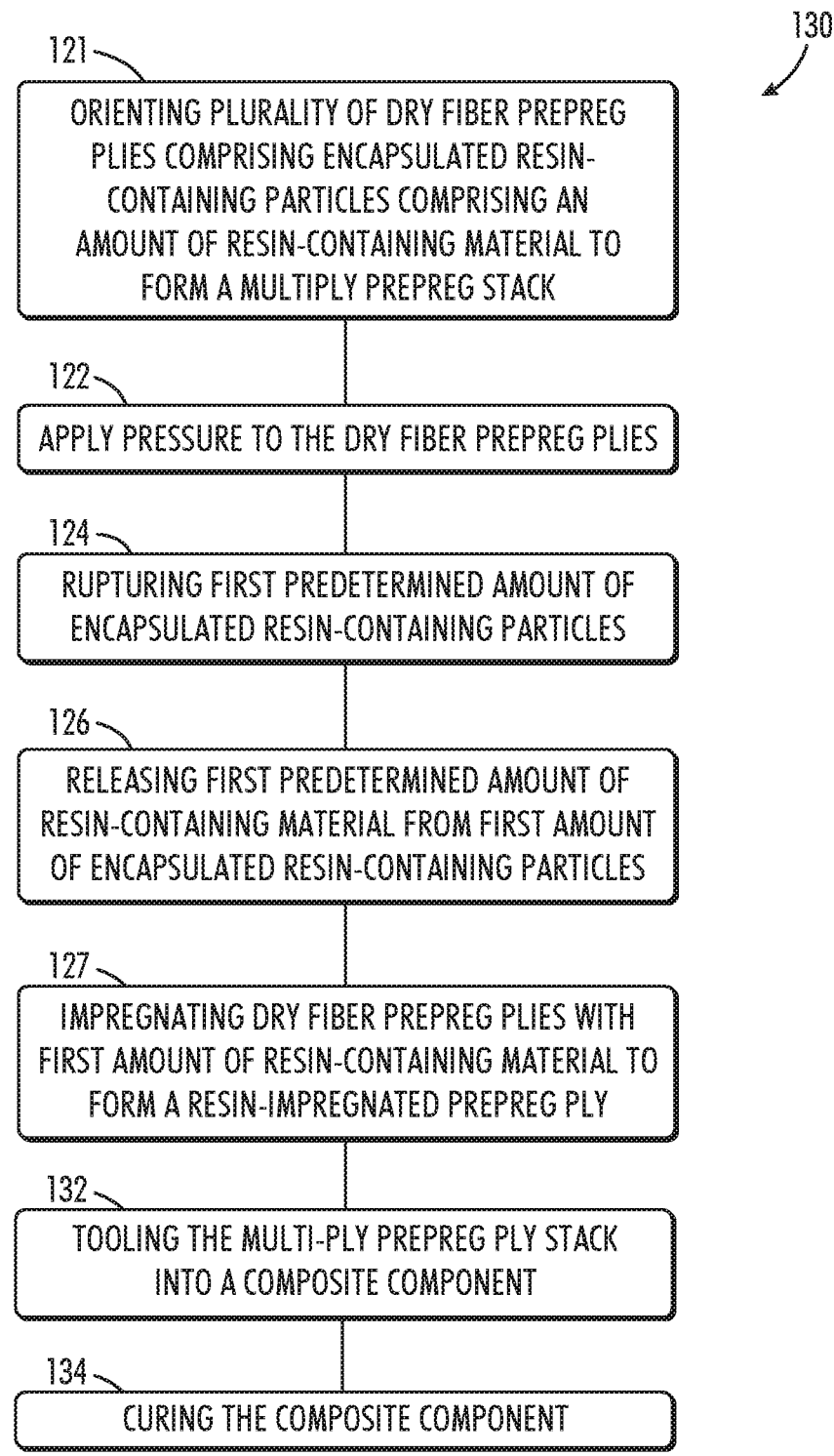
Figure 14:
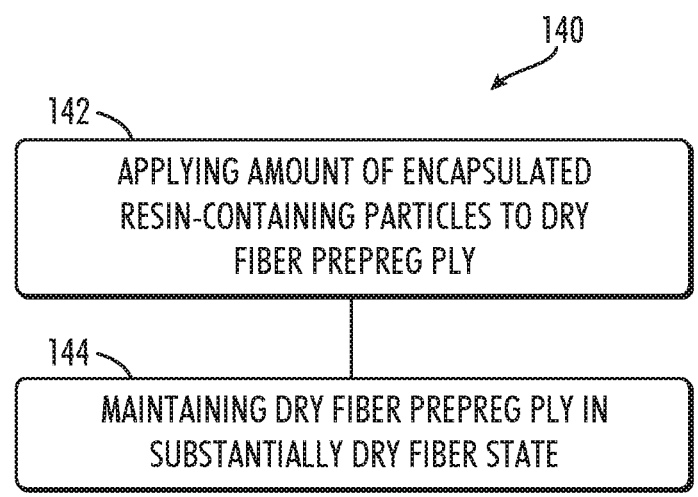

FIG. 13 illustrates a method 130 according to aspects of the present disclosure of 121 orienting a plurality of dry fiber prepreg plies comprising encapsulated resin-containing particles to form a multi-ply prepreg stack, 122 applying pressure to the dry fiber prepreg plies, 124 rupturing a first predetermined amount of encapsulated resin-containing particles, 126 releasing a first predetermined amount of resin-containing material from the first predetermined amount of resin-containing particles, 127 impregnating the dry fiber prepreg plies with the first amount of resin-containing material released from the first amount of encapsulated resin-containing particles to form a resin-impregnated prepreg ply, 132 tooling the multi-ply prepreg stack into a composite component, and 134 curing the composite component FIG. 14 illustrates a method 140 according to aspects of the present disclosure comprising 142 applying an amount of encapsulated resin-containing particles to a dry fiber prepreg ply, and 144 maintaining the dry fiber prepreg ply in a substantially dry fiber state Methods for applying the encapsulated resin-containing particles include, without limitation, modifications to common prepregging methodologies, as well as secondary surface application of the particles after an initial resin impregnation. According to one method, a predetermined amount of encapsulated resin-containing particles are transferred onto a dry fiber prepreg ply from a first roll, such as, for example, a paper or film roll, etc. The resin-containing particles are deposited onto a paper or film carrier sheet either from a supply of particles, or as they are created. The carrier sheet is then directed to contact the dry fiber prepreg ply, such as, via rollers that may be configured to apply a predetermined amount of pressure to dislodge the particles from the paper/film carrier sheet and transfer the particles to the dry fiber prepreg ply without rupturing the particles. According to an aspect of the disclosure, in this method, rolls of carrier sheet comprising the encapsulated resin-containing particles are integrated into the prepregging production line, with the carrier sheets unrolled in line and synchronized with the dry fiber prepreg feed. According to this method the particle transfer from the carrier sheet to the dry fiber prepreg occurs upon contact and may incorporate use of an electrostatic charge to assist in the particle transfer from the carrier sheet onto the dry fiber prepreg ply.

FIG. 15 is a representative side view of a system 150 for applying encapsulated resin-containing particles to a dry fiber prepreg. For the purposes of the present application, the terms "encapsulated resin-containing particles" and "resin-containing particles" and "particles" are equivalent terms and are used interchangeably herein. As shown in FIG. 15, carrier material 151 from a carrier material supply such as, for example, a roll (not shown) comprising encapsulated resin-containing particles 152 is directed to proceed around first rollers 153 in a direction shown by "arrows", and directed to second roller assembly 155. Concurrently, a dry fiber prepreg ply 154 is directed from a dry fiber prepreg supply such as, for example, a roll (not shown), and proceeds in the direction of "arrows" until the dry fiber prepreg ply 154 passes second roller assembly 155, and is brought proximate to the carrier material 151 comprising the encapsulated resin-containing particles 152. When the carrier material 151 and the dry fiber prepreg ply 154 are proximate to one another between second roller assembly 155, a predetermined amount of the encapsulated resin-containing particles 152 are transferred from the carrier material 151 to the dry fiber prepreg ply 154. The dry fiber prepreg ply 156 now comprising the encapsulated resin-containing particles 152 is directed away from second roller assembly 155 in a direction shown by "arrows" for further processing, or can be rolled into a dry fiber prepreg roll for later use. Similarly, carrier material substantially devoid of the encapsulated resin-containing particles 157 is directed away from second roller assembly 155 and discarded, rolled, etc., and/or recycled for further use.

Figure 16A:
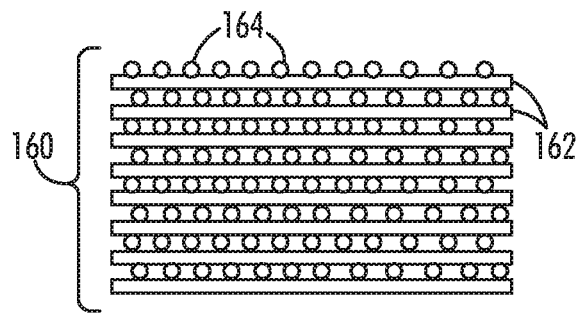
Figure 16B:
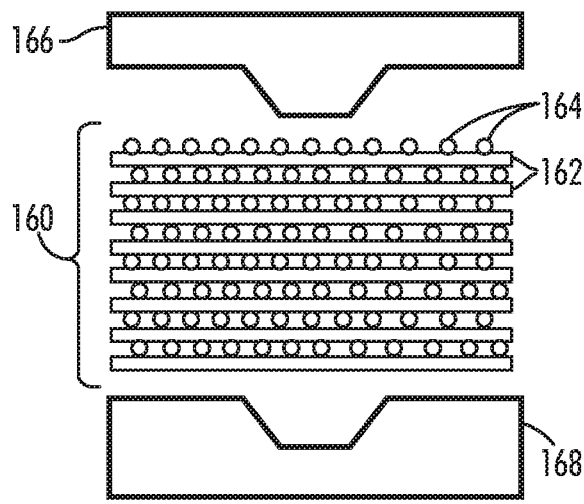
Figure 16C:
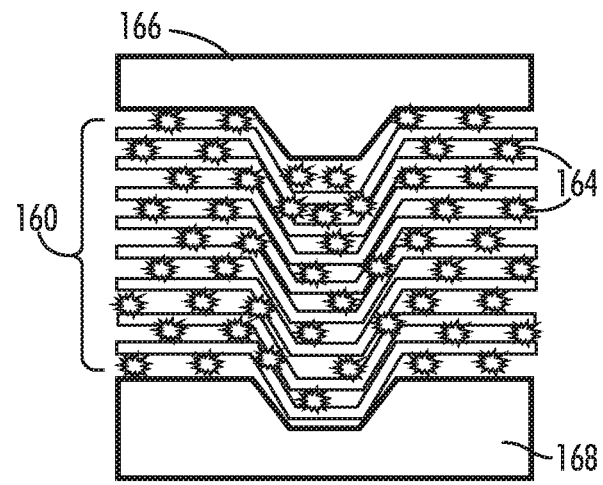
Figure 16D:
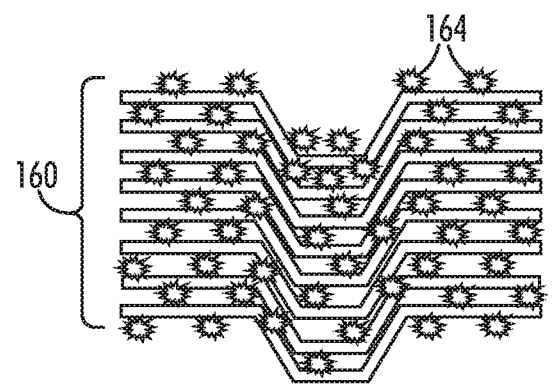
Figure 17:
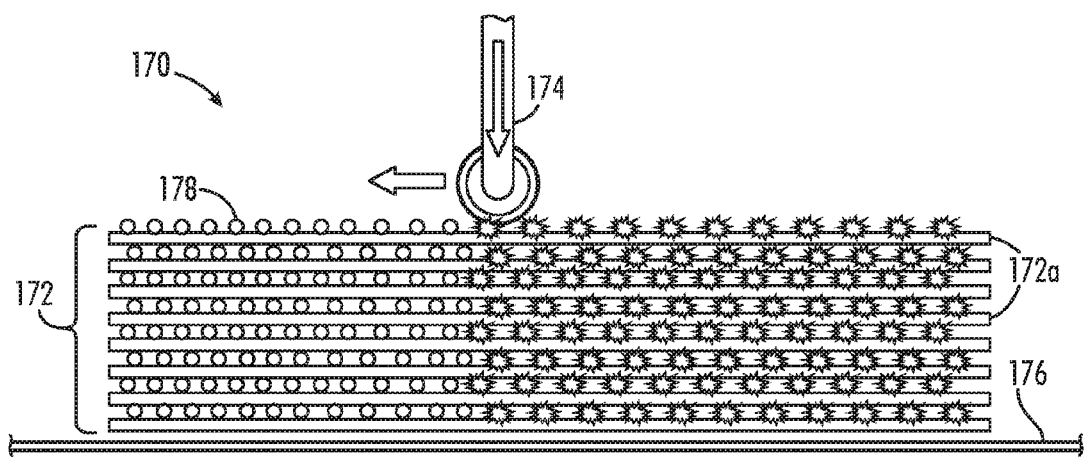

FIGS. 16A-16D and 17 show variations of the processing for dry fiber prepreg plies, according to further aspects of the present disclosure, whereby pressure is supplied, in the form of tooling dies (FIGS. 16A-16D) or a roller (FIG. 17). FIG. 16 shows a representative view of a dry fiber prepreg stack 160 comprising individually laid up dry fiber plies 162 comprising encapsulated resin-containing particles 164. In FIG. 16B, prepreg stack 160 is shown oriented between first and second halves 166, 168 of a tool. In FIG. 16C, the one or both of the first and second halves 166, 168 of the tool are brought toward each other in mating fashion, under pressure, to contact the prepreg stack 160, for example, for the purpose of shaping or tooling the stack 160 into a desired configuration. At this point, the predetermined pressure exerted on the stack ruptures the encapsulated resin-containing particles 164, releasing resin-containing material from the particles 164 into the prepreg stack 160. FIG. 16D shows the now-tooled stack 160 removed from the first and second halves 166, 168 of the tool. As shown in FIGS. 16C and 16D, the encapsulated resin-containing particles have just ruptured, with resin-containing material being released from the ruptured particles. As shown, the released resin-containing material is beginning to impregnate and migrate into the dry fiber plies.

According to a further aspect, FIG. 17 shows a system 170 for processing a prepreg stack 172 comprising a roller assembly 174 that applies a downward pressure to the stack (shown as a vertical "arrow"). According to one aspect, the prepreg stack rests on a support 176, and the roller assembly 174 is directed in the direction of the horizontal "arrow", while the roller assembly 174 applies the downward pressure on the prepreg stack 172. As shown, a predetermined amount of the encapsulated resin-containing particles 178 in the individual plies 172a of the prepreg stack 172 are ruptured, releasing resin-containing material from the encapsulated resin-containing particles 178. It is understood that, according to further aspects, the prepreg stack could be processed to effect a rupture of the encapsulated resin-containing particles, by maintaining a pressure-inducing device, such as, for example a roller assembly, in a substantially fixed position, while the prepreg stack is advanced on a moving platform, (such as, for example a belt assembly, etc.), past the pressure-inducing device.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, bridge trusses, support columns, general construction object, etc. Further objects include, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A method comprising:
   orienting at least one dry fiber prepreg ply, said dry fiber prepreg ply comprising encapsulated resin-containing particles, and said encapsulated resin-containing particles collectively comprising an amount of resin-containing material;
   applying pressure to the dry fiber prepreg ply;
   rupturing a first predetermined amount of the encapsulated resin-containing particles;
   releasing a first predetermined amount of resin-containing material from the first amount of encapsulated resin-containing particles; and
   impregnating the dry fiber prepreg ply with the first predetermined amount of resin-containing material released from the ruptured encapsulated resin-containing particles to form a resin-impregnated prepreg ply wherein, in the step of rupturing the first predetermined amount of encapsulated resin-containing particles, the first predetermined amount of ruptured encapsulated resin-containing particles ranges from about 25% to about 75% of the total amount of encapsulated resin-containing particles.

2. The method of claim 1, further comprising:
   curing the resin-impregnated prepreg ply.

3. The method of claim 1, wherein, in the step of orienting the at least one dry fiber prepreg ply, a plurality of dry fiber prepreg plies are oriented relative to one another to form a multi-ply prepreg stack.

4. The method of claim 1, wherein, in the step of orienting the at least one dry fiber prepreg ply, the dry fiber prepreg ply comprises: carbon fibers, carbon/graphite fibers, glass fibers, aramid fibers, boron fibers, and combinations thereof.

5. The method of claim 1, wherein, in the step of orienting the at least one dry fiber prepreg ply, the resin-containing material comprises: epoxy-based resin materials.

6. The method of claim 1, wherein, in the step of orienting the dry fiber prepreg ply, the resin-containing material comprises at least one of an epoxy-based resin material comprising digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

7. The method of claim 1, wherein, in the step of orienting the at least one dry fiber prepreg ply, the encapsulated particles each comprising an average diameter ranging from about 20 microns to about 1000 microns.

8. The method of claim 1, wherein in the step of applying pressure to the dry fiber prepreg ply, further comprises:
   applying a pressure to the at least one dry fiber prepreg ply, said pressure ranging from about 250 lb/ft$^2$ to about 350 lb/ft$^2$.

9. The method of claim 1, wherein, in the step of orienting the at least one dry fiber prepreg ply, the dry fiber prepreg ply comprises at least one surface having a tack value ranging from about 0.1 psi to about 50 psi.

10. The method of claim 1, wherein, in the step of orienting the at least one dry fiber prepreg ply, the encapsulated resin-containing particles comprise an average particle wall thickness ranging from about 100 nm to about 1 micron.

11. The method of claim 1, wherein, in the step of orienting the at least one dry fiber prepreg ply, the encapsulated resin-containing particles comprise a shell material, said shell material comprising at least one of: urea polyimide; melamine-; formaldehyde; urea-formaldehyde; polyuria-formaldehyde; polyoxymethylene and combinations thereof.

12. The method of claim 2, wherein, in the step of curing the resin-impregnated prepreg ply, a second predetermined amount of encapsulated particles rupture.

13. The method of claim 3, wherein in the step of curing the multi-ply prepreg stack, a second predetermined amount of ruptured embedded resin-containing particles ranges from about 25% to about 75% of the total amount of encapsulated resin-containing particles.

14. The method of claim 3, further comprising the step of:
   curing the multi-ply prepreg stack.

15. The method of claim 14, wherein, before the step of curing the multi-ply prepreg stack, comprising:
   tooling the multi-ply prepreg stack into a predetermined orientation.

16. A method comprising:
   applying encapsulated resin-containing particles to a dry fiber prepreg ply, wherein a first predetermined amount of about 25% to about 75% of said encapsulated resin-containing particles are configured to rupture at a pressure ranging from about 250 lb/ft² to about 350 lb/ft²; and maintaining the dry fiber prepreg ply in a substantially dry state after applying the predetermined amount of encapsulated resin-containing particles in the dry fiber prepreg ply.

17. The method of claim 16, wherein, in the step of applying a predetermined amount of encapsulated resin-containing particles to a dry fiber prepreg ply, the encapsulated resin-containing particles are applied as a surface layer to the dry fiber prepreg ply.

18. The method of claim 16, wherein, in the step of applying a predetermined amount of encapsulated resin-containing particles to a dry fiber prepreg ply, the encapsulated resin-containing particles are embedded into dry fiber prepreg ply.

19. A dry fiber prepreg ply comprising:

of encapsulated resin-containing particles said encapsulated resin-containing particles comprising resin-containing material;

wherein a first predetermined amount about 25% to about 75% of the encapsulated resin-containing particles are configured to rupture at a pressure ranging from about 250 lb/ft² to about 350 lb/ft², and said encapsulated resin-containing particles are configured to release a first predetermined amount of resin-containing material from the encapsulated resin-containing particles into the dry fiber prepreg ply.

20. The dry fiber prepreg ply of claim 19, wherein the dry fiber prepreg ply comprises: carbon fibers, carbon/graphite fibers, glass fibers, aramid fibers, boron fibers and combinations thereof.

21. The dry fiber prepreg ply of claim 19, wherein resin-containing material in the encapsulated resin-containing particles comprises epoxy-based resin materials.

22. A multi-ply stack of prepreg plies comprising a plurality of the dry fiber prepreg plies of claim 19.

* * * * *